(12) United States Patent
Squicciarini

(10) Patent No.: US 12,578,247 B2
(45) Date of Patent: Mar. 17, 2026

(54) EYE GLASSES LENS INSPECTION DEVICE WITH INTERCHANGEABLE LENSES

(71) Applicant: OptiSource International, Inc., Bellport, NY (US)

(72) Inventor: Daryl Squicciarini, Bellport, NY (US)

(73) Assignee: Essilor of America, Inc., Dallas, TX (US)

( * ) Notice: Subject to any disclaimer, the term of this patent is extended or adjusted under 35 U.S.C. 154(b) by 627 days.

(21) Appl. No.: 17/818,683

(22) Filed: Aug. 9, 2022

(65) Prior Publication Data

US 2023/0037795 A1 Feb. 9, 2023

Related U.S. Application Data

(60) Provisional application No. 63/231,115, filed on Aug. 9, 2021.

(51) Int. Cl.
G01M 11/02 (2006.01)
(52) U.S. Cl.
CPC .................................. G01M 11/02 (2013.01)

(58) Field of Classification Search
CPC .. G01M 11/00; G01M 11/02; G01M 11/0278; G01M 11/0214; G01M 11/08; G01M 11/2014; G02B 21/0008; G02B 25/001; G02B 25/0008
See application file for complete search history.

(56) References Cited

FOREIGN PATENT DOCUMENTS

GB 2171812 A * 9/1986 ........ G01M 11/0214

OTHER PUBLICATIONS

Canton Optics; "T51110 Lens Inspection Station"; Jul. 1, 2021; Facebook; https://www.facebook.com/watch/?v=4158317967593197 (Screenshots also included) (Year: 2021).*

* cited by examiner

*Primary Examiner* — Michelle M Iacoletti

(74) *Attorney, Agent, or Firm* — Peter V. Schroeder; Booth Albanesi Schroeder PLLC

(57) ABSTRACT

The disclosure relates to multi-purpose eyeglass lens inspection devices, and more particularly to such a device having a lighted base with a viewing lens assembly, an inspection lens assembly, and a plurality of interchangeable lenses with integral storage for the interchangeable lenses.

14 Claims, 6 Drawing Sheets

*F*IG. 1

EYE GLASSES LENS INSPECTION DEVICE WITH INTERCHANGEABLE LENSES

CROSS-REFERENCE TO RELATED APPLICATIONS

This is a U.S. Non-Provisional application for patent claiming priority to U.S. Provisional Patent Application No. 63/231,115, filed Aug. 9, 2021, entitled Glasses Lens Inspection Device.

TECHNICAL FIELD

The disclosure relates to multi-purpose eyeglass lens inspection devices, and more particularly to such a device having a lighted base with a viewing lens assembly, an inspection lens assembly, and a plurality of interchangeable lenses with integral storage for the interchangeable lenses.

BRIEF DESCRIPTION OF THE DRAWINGS

For a more complete understanding of the present disclosure, and the advantages thereof, reference is now made to the following description which is to be taken in conjunction with the accompanying drawings in which like reference numerals indicate like parts and wherein.

DETAILED DESCRIPTION OF THE DISCLOSURE

Figure 1:
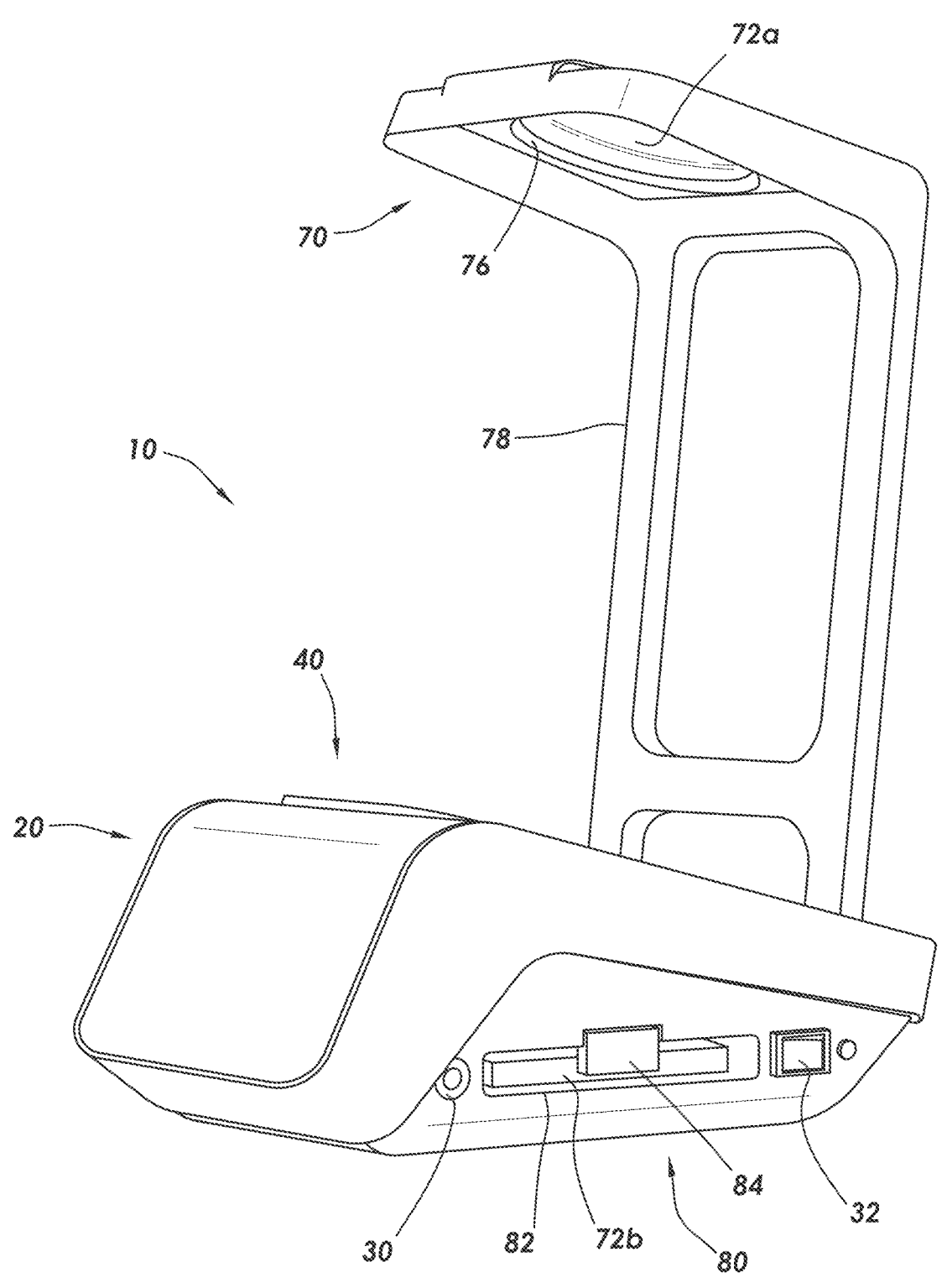
FIG. 1 is an orthogonal view of an exemplary eye glasses lens inspection device with interchangeable lenses according to certain aspect of the disclosure.

A multi-purpose eyeglass lens inspection device 10 is provided. The device 10 comprises at least a base assembly 20 having a light source 28 and inspection lens assembly 40, and a viewing lens assembly 70 having a viewing lens 72 held spaced above the base assembly 20.

Figure 2:
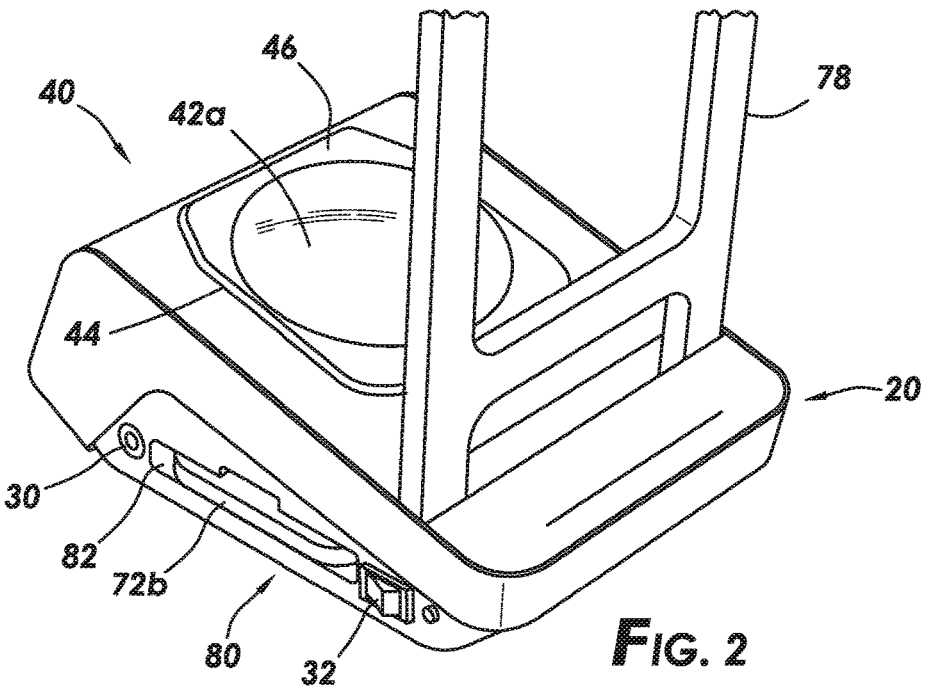
FIG. 2 is an orthogonal side view of the device of FIG. 1, showing an inspection lens positioned on the device.
Figure 3:
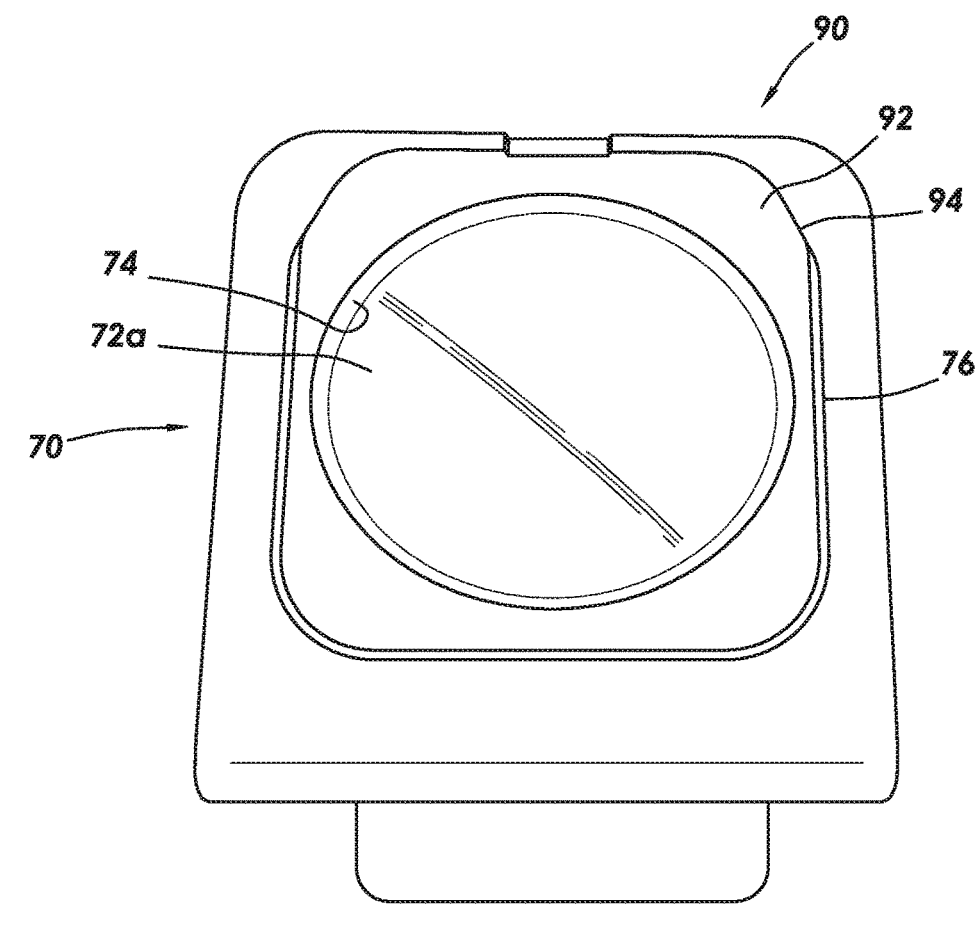
FIG. 3 is a top view of an exemplary eye glasses lens inspection device showing an exemplary viewing lens assembly according to aspects of the disclosure.
Figures 4A, 4B:
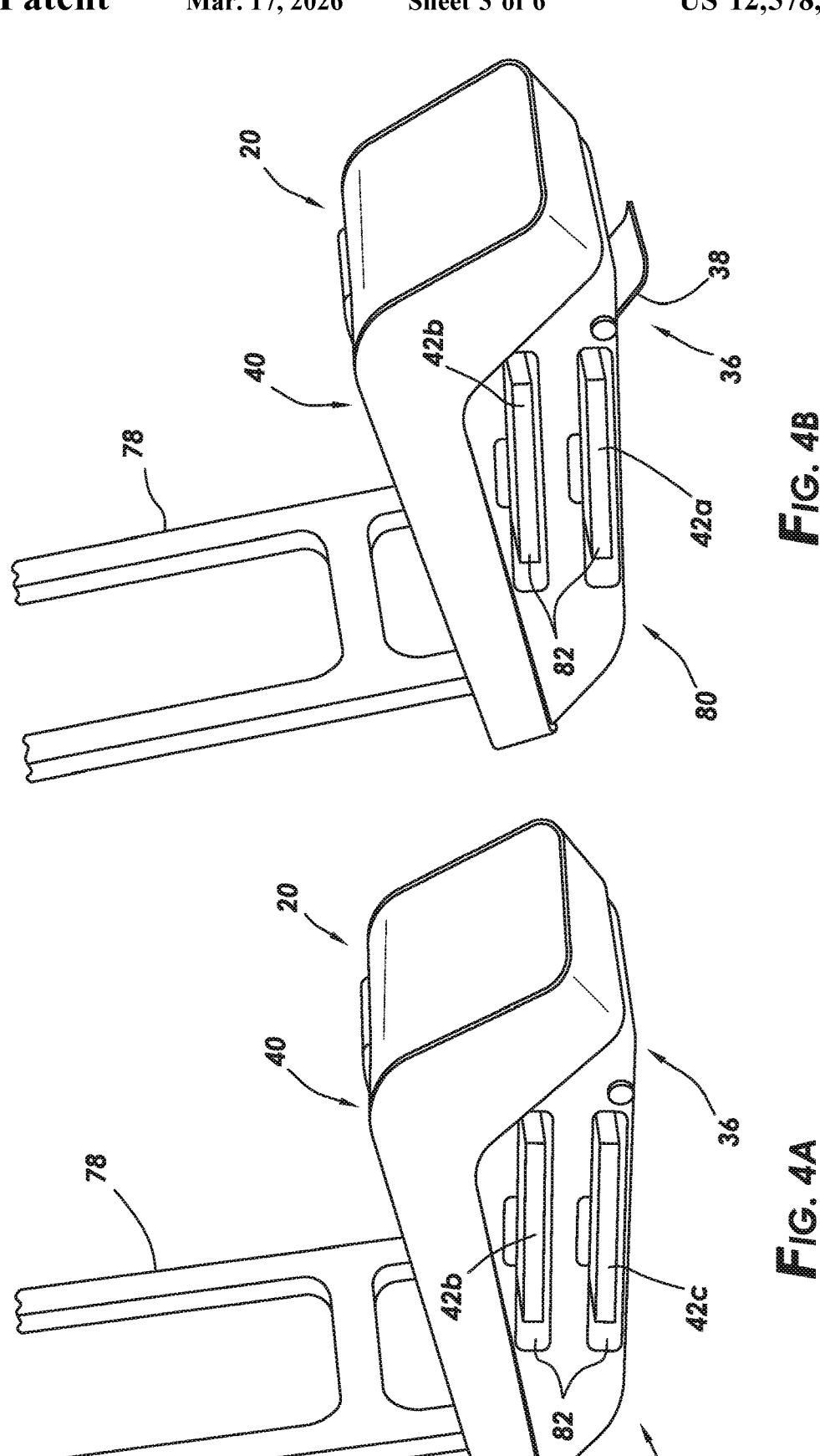
FIG. 4 is a side view of two exemplary eye glasses lens inspection devices of FIGS. 1-2, the left device with a tilt adjustment mechanism in a stowed position and the rights showing the tilt adjustment mechanism in an extended position.
Figure 5:
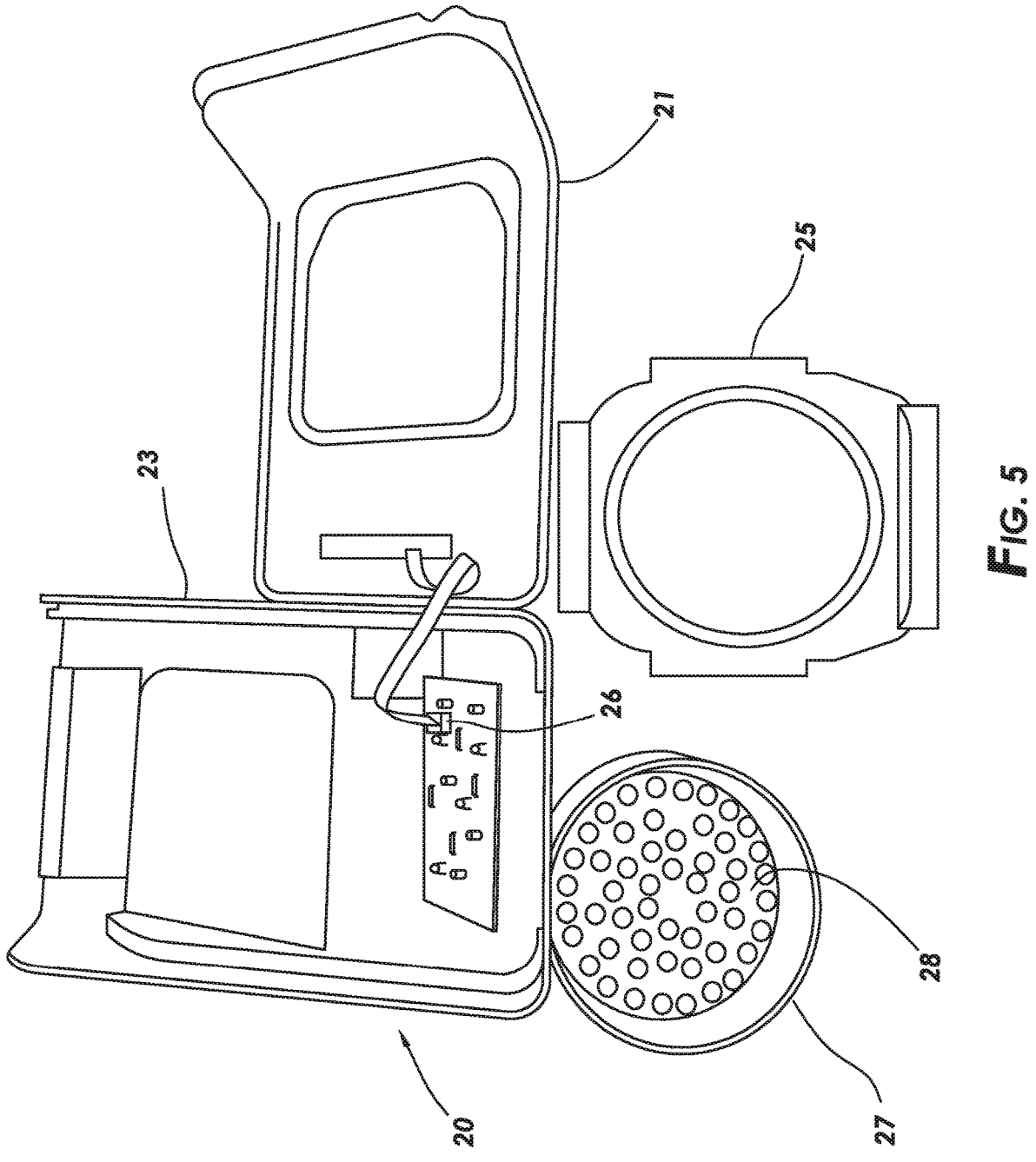
FIG. 5 is a top view of a disassembled eye glasses inspection device showing the interior equipment in the device.
Figure 6A:
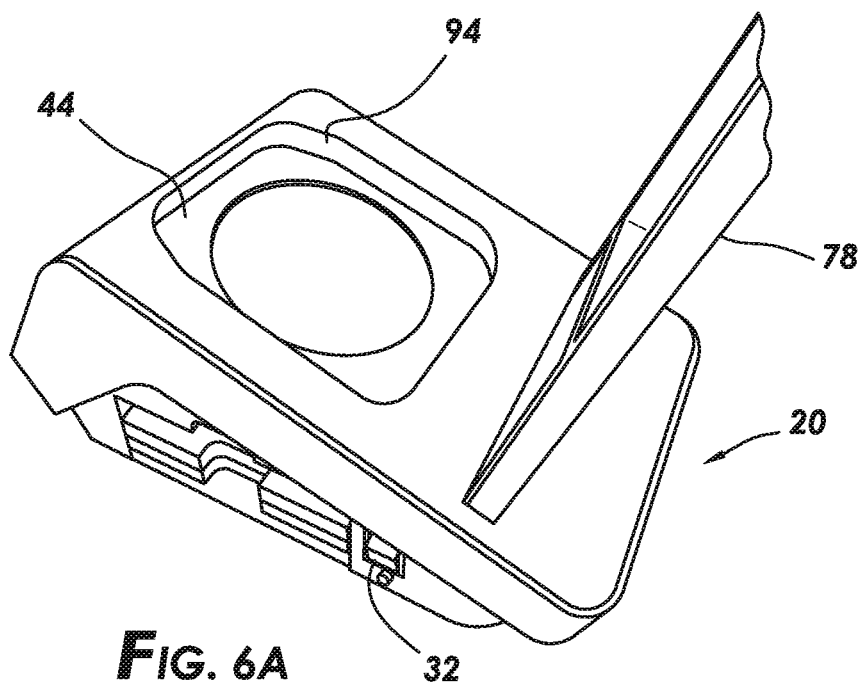
FIGS. 6A-B are orthogonal views of an exemplary eye glasses inspection device according to aspects of the disclosure showing the device with an inspection lens in position and without an inspection lens.
Figure 6B:
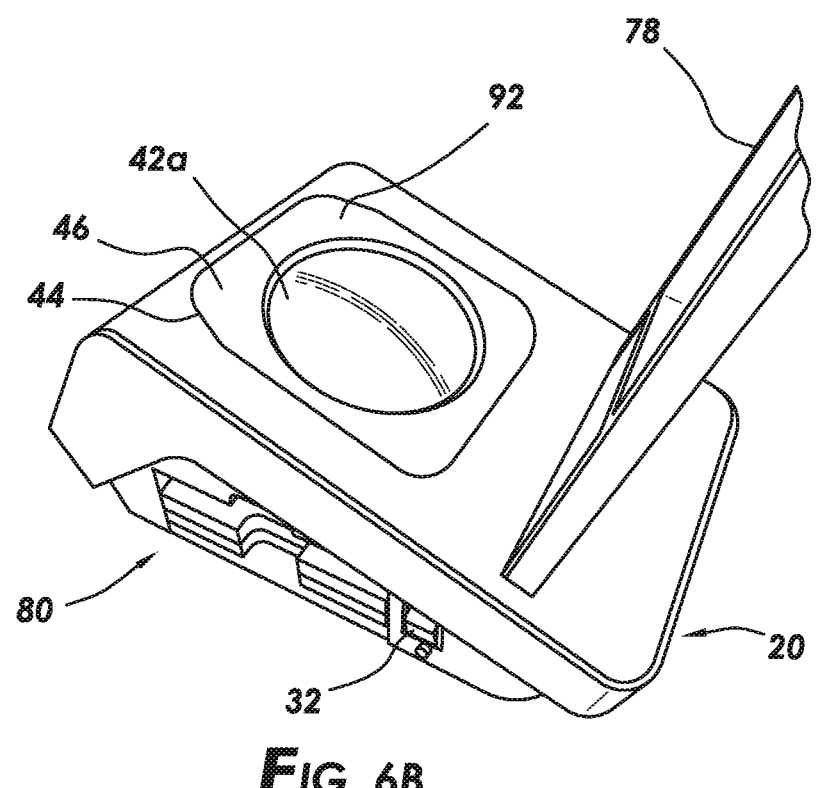
Figure 7A:
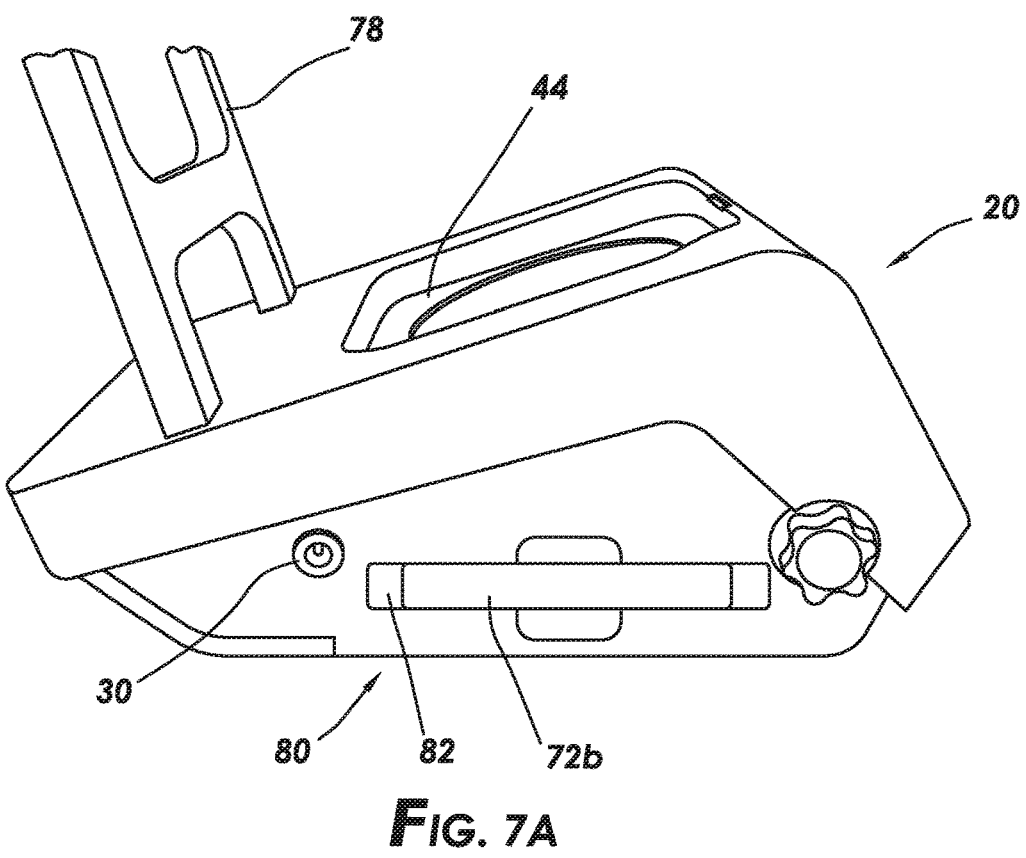
FIGS. 7A-B are side views of an exemplary eye glasses inspection device showing a storage compartment with an inspection or viewing lens inserted into the compartment and an empty compartment.
Figure 7B:
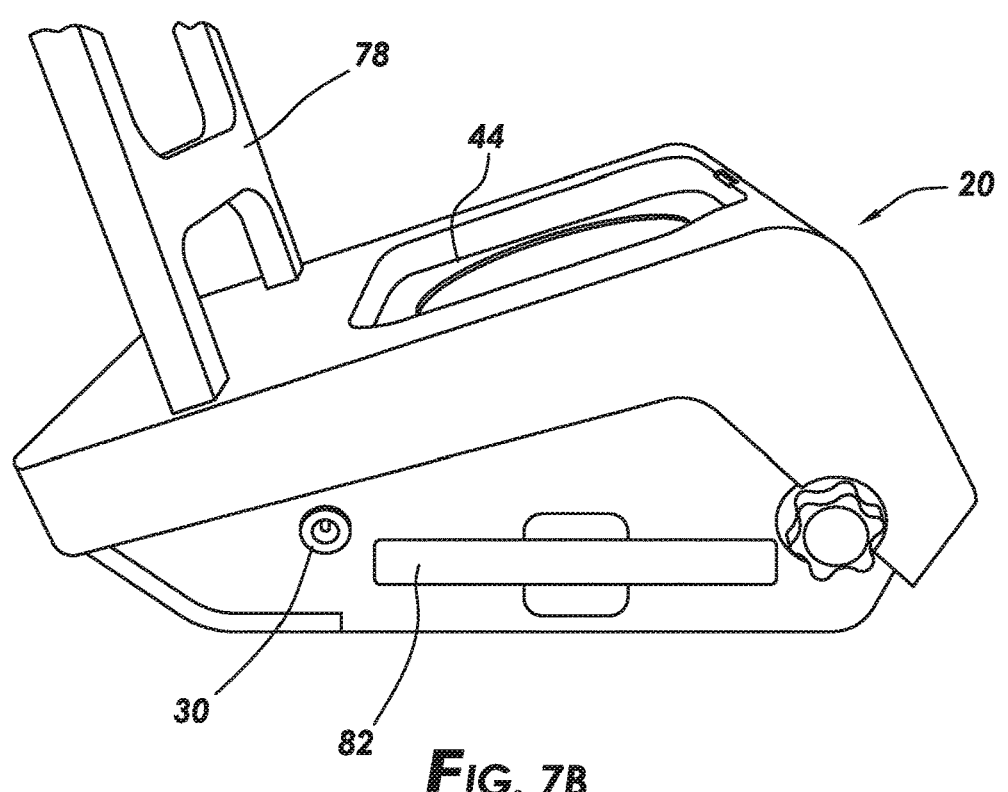

The figures will be discussed together. FIG. 1 is an orthogonal view of an exemplary eye glasses lens inspection device with interchangeable lenses according to certain aspect of the disclosure. FIG. 2 is an orthogonal side view of the device of FIG. 1, showing an inspection lens positioned on the device. FIG. 3 is a top view of an exemplary eye glasses lens inspection device showing an exemplary viewing lens assembly according to aspects of the disclosure. FIG. 4 is a side view of two exemplary eye glasses lens inspection devices of FIGS. 1-2, the left device with a tilt adjustment mechanism in a stowed position and the rights showing the tilt adjustment mechanism in an extended position. FIG. 5 is a top view of a disassembled eye glasses inspection device showing the interior equipment in the device. FIGS. 6A-B are orthogonal views of an exemplary eye glasses inspection device according to aspects of the disclosure showing the device with an inspection lens in position and without an inspection lens. FIGS. 7A-B are side views of an exemplary eye glasses inspection device showing a storage compartment with an inspection or viewing lens inserted into the compartment and an empty compartment. The figures generally show multiple embodiments of exemplary devices, which have similar features and are discussed together with like and corresponding parts sharing identifying numbering.

The base assembly 20 includes electronics 26 operable to convert electrical power from a power source into visible light. The base assembly 20 includes at least one light bulb 28 for this purpose, which can be an LED (as shown), incandescent, fluorescent, or other type of light source, such as is known in the art. The power source can be mounted on or in the base unit, such as a battery assembly. Alternately or in combination, the base assembly 20 can include an electrical jack 30 for connecting to a power cord and plug for use with a standard electrical outlet, or can include the power cord and plug. Appropriate control switches 32 are provided for controlling the light source, such as a power (on/off) switch, dimmer switch, and other switches as are known in the art. As seen in FIG. 5, the base assembly can be comprised of multiple pieces which fit or are attached together, such as an upper body member 21, lower body member 23, light cover 25, bulb holder 27, and the like.

The base assembly 20 comprises an inspection lens holder assembly 40 for holding one of a set of interchangeable inspection lenses 42, shown without limitation as having three interchangeable inspection lenses 42a-c.

The inspection lens holder assembly 40 orients an inspection lens 42a in a desired orientation. As shown, the inspection lens orientation is generally horizontal and can be slightly angled from the horizontal. The angle is selected for ease of use for the user. In use, the viewing and inspection lenses are positioned in a generally parallel relationship. The user looks through the viewing lens 72 towards the inspection lens 42. An eye glasses lens is positioned between the inspection and viewing lenses for inspection. For example, if the inspection lens 42 is generally horizontal, the user will look through a generally horizontal viewing lens 72 in a generally downward direction to view the generally horizontal inspection lens 42 (and any intervening eye glasses lens for inspection).

The inspection lens holder assembly 40 comprises a lens slot 44 of a desired shape and size, for receiving a cooperating inspection lens 42. In some embodiments, each inspection lens 42 is held in a corresponding frame 46 which surrounds the periphery of the inspection lens 42. The frame 46 is shaped and sized to cooperatively fit within the slot 44 of the inspection lens holder assembly 40. The frame 46 can be friction fit, slidably fit, "snap-on" fit, or otherwise cooperatively and removably fit into the slot 44. The lens holder slot 44 holds the inspection lens 42 during use of the device in inspecting eye glasses lenses. The lens holder assembly 40 is positioned above the light source 28 such that the light, when actuated, shines through the inspection lens 42 held in the slot 44.

The viewing lens assembly 70 comprises at least one viewing lens 72. In some embodiments, the viewing lens 72 is permanently installed on the device. That is, while the lens can be replaced if defective or broken, it is not intended to be routinely removed and interchanged with other viewing lenses. In some embodiments, the device includes multiple, interchangeable viewing lenses 72, such as viewing lenses 72*a-b*, without limitation, each of the viewing lenses having a frame 74 surrounding the periphery of the viewing lens. The viewing lens assembly 70 can include a viewing lens holder having a viewing lens slot 76 for cooperatively receiving the frames 74 of the viewing lenses 72. For example, a viewing lens 72 is provided with a frame 74 holding the lens. The frame 74 is shaped and sized to cooperatively fit within the slot 76 of the viewing lens holder assembly 70. The frame 74 can be friction fit, slidably fit, "snap-on" fit, or otherwise cooperatively and removably fit into the slot 76. The lens holder slot 76 holds the viewing lens 72 in position during use of the device.

The viewing lens holder assembly 70 is positioned above the light source 28 and inspection lens 42 such that the light, when actuated, shines through the inspection lens and then through the viewing lens. The viewing lens slot can be defined in a support arm 78 of the viewing lens assembly 70. The viewing lens is held generally parallel to the inspection lens. The viewing lens 72, in some embodiments, is selectively removable and replaceable with additional interchangeable viewing lenses 72. The viewing lens, or frame and lens combination, can be removed by the user and interchanged with one or more additional viewing lenses. For example, additional viewing lenses can be provided to provide differing magnifications, replacement lenses in case of loss or damage, filtering lenses, colored lenses, etc., as are known in the art.

The viewing lens assembly 70 is maintained in a spaced apart position with respect to the base assembly 20, such as by a support arm 78 or the like. The arm 78 can be rigidly or movably attached to the base assembly 20 and/or viewing lens assembly 70. For example, the support arm 78 can adjustably pivot with respect to the base assembly 20. The support arm 78 can also, in some embodiments, move the viewing lens assembly 70 towards and away from the base assembly 20, such as on a telescoping arm or the like. The viewing lens assembly 70 can be pivotally attached to the support arm 78. The support arm 78 can be pivotally attached to the base assembly 20. The base assembly 20, support arm 78 and viewing lens assembly 70 can be sized and arranged such that the viewing assembly and support arm fold into storage positions generally parallel to the base assembly, inspection lens or inspection lens holder.

The base assembly 20 may include a tilt adjustment mechanism 36, as best seen in FIG. 4, for adjusting the inspection lens orientation, the viewing lens orientation and the viewing angle for the user. The adjustment may be controlled by a knob or lever and the angle may be altered by raising or lowering the angle of the base. In the exemplary adjustment mechanism 36 shown, a tilt adjustment leg 38 can be moved between a stowed positon, as seen in the left-hand device in FIG. 4, and an extended position, as seen in the right-hand device in FIG. 4, wherein the viewing angle is adjusted between an initial and adjusted position, respectively.

The base assembly 20, in some embodiments, comprises a storage assembly 80. The storage assembly 80 can comprise multiple storage compartments 82. Each of the compartments 82 is sized to receive and store one or more of a plurality of inspection lenses 42*a-c*, with or without corresponding frames 46, and/or one or more of a plurality of viewing lenses 72*a-b*, with or without corresponding frames 74. The storage assembly 80 is defined in the base assembly 20. The storage compartments 82 are defined as spaces interior to the base assembly 20. The storage compartments can be open-ended, as shown, or enclosed with access provided through an opening and closing door. The door can be pivotally, slidably or otherwise movable attached to the base assembly and movable between an open position in which access to the compartment is provided and a closed position in which the lenses are maintained in the compartment. The door can be operated by a latch 84, lock, friction fit, or other means known in the art. Preferably, the storage assembly 80 provides compartments for holding all, or all but one, of the interchangeable inspection lenses and/or viewing lenses. In some embodiments, a viewing lens is positioned in the slot of the viewing lens assembly, an inspection lens is positioned in the slot of the base assembly, and the remaining interchangeable lenses are positioned in the storage compartments.

The base assembly can provide storage compartments 82 on multiple sides of the base assembly. For example, one side of the base assembly, seen in FIGS. 1-2 and 6A-B and 7A-B, has a single storage compartment 82 for holding a single interchangeable lens. The opposite side of the base assembly, as seen in FIG. 4, for example, has multiple storage compartments 82, each for a single lens. It is also possible to have a single compartment sized to store multiple lenses. The framed lenses can latch into a stowed position in some embodiments, such as by cooperating magnets mounted in the lens frame and the interior of the compartment, or by push-to-close, push-to-open latches, or other latches as are known in the art.

The viewing and inspection lenses can be of similar size and shape, with or without corresponding frames, such that any lens can be placed in any lens slot. Alternately, the viewing lenses and/or frames can be of differing size or shape, in comparison to the inspection lenses and/or frames, such that the viewing lenses will cooperate only with the viewing lens slot (and vice versa).

In some embodiments, the disclosure provides for alignment mechanisms to insure that the interchangeable lenses, with or without frames, are properly oriented for accurate and easy viewing and inspection. This discussion will focus on a framed inspection lens, but the same principals can be applied to unframed lenses, and to viewing lenses. In an exemplary embodiment, an inspection lens 42 is held by a corresponding frame 46. The frame 46 is sized and shaped to fit into the inspection lens slot 44. However, since in some applications it is important that the inspection lens be oriented correctly, an alignment mechanism 90 is provided. The alignment mechanism 90 insures that the lens is positioned correctly in the slot. In the embodiment shown, the alignment mechanism 90 includes a non-symmetrically shaped frame 92 which fits into a corresponding non-symmetrically shaped slot 94. The non-symmetrical frame 92, in the example shown, is generally square in cross-section with rounded corners. However, two of the corners also incorporate angled portions, such that the frame can be considered an irregular hexagon in cross-section. Other alignment mechanisms can include pins, protrusions or contours which extend from the frame vertically or horizontally and which fit into corresponding detents, indentations or contours in the sides or back of the slot. If the lenses are slidably attachable to the slot, the frame can include an alignment mechanism such as a sloped, beveled, or other shaped frame top or bottom surface.

Note that alignment mechanisms 90 can include up/down alignment mechanisms and/or rotational orientation mechanisms. For example, an up/down mechanism insures that the lens is placed with the appropriate lens side face up ("right side up"), that is, such that the user views through the upper surface of the lens first. Rotational alignment mechanisms insure that the lens is rotationally aligned; that is, spun to the correct orientation (like the hands on a clock). Rotational alignment might be of importance, for example, with polarized lenses and the like.

In some embodiments, the lens or lens frame includes indicia for indicating which side of the lens should face up or down, left or right, etc.

The interchangeable inspection lenses in some embodiments include at least some of the following: polarized lens, polariscope lens, gray tinted polarized lens, green tinted polarized lens, plain lens, tinted lens, PAL identifier lens, tinted PAL identifier lens, frosted lens, clear lens, and magnifying lens. The interchangeable viewing lenses in some embodiments include at least some of the following: clear lens, magnifying lenses of varying strength, polarized lenses, and tinted lenses.

PAL refers to progressive addition lens(es). A PAL identifier, or progressive identifier, refers to markings placed onto or within a glasses lens to identify data about the lens, such as make, model, material and 180 reference marks. The PAL markings are typically not visible to the naked eye but can be seen when viewed through a specialized PAL identifier lens. Progressive lenses have three prescriptions in a single glasses lens, allowing a user to do close-up work, middle-distance work, or distance viewing without changing lenses. The PAL identifier lens can be a black-line or gray-line grid lens, for example. Translucent tinted lenses can be used as well.

The PAL identifier lenses bring into focus progressive addition lens (PAL) manufacturer's engravings, revealing information such as make, model, material and 180 reference marks, which are otherwise invisible. Multiple PAL identifier lenses can be provided, for example, in different tints. The PAL identifier lenses preferably make the PAL engravings or markings appear three dimensionally embossed, easily read, and/or marked.

Polariscope lenses allows the user to identify and check the orientation of polarized spectacle lenses, detect hidden mounting-stress points, and identify tempered glass lenses. Multiple polariscope lenses can be provided, for example, in different tints.

A clear and/or tinted lens can be provided for generally inspection of the glasses lens, for example, to identify scratches and lens abnormalities in finished lenses.

In use, a glasses lens is placed above the base unit, aligned with the inspection lens, and below the viewing lens. A user, viewing through the viewing lens, sees a backlit glasses lens with an inspection lens behind it. Light is emitted from the light source, through the inspection lens, through the glasses lens being inspected, and through the viewing lens, to the eye of the user.

While the making and using of various embodiments of the present disclosure are discussed in detail below, it is appreciated that the present disclosure provides many applicable concepts that may be embodied in a wide variety of specific contexts. The specific embodiments discussed herein are merely illustrative of specific ways to make and use the disclosure. Only the claims appended hereto delimit the scope of any claimed inventions.

It is claimed:

1. An eye glasses lens inspection device comprising:
   a base assembly having a light source;
   an inspection lens slot defined on the base assembly for selectively receiving one of a plurality of interchangeable inspection lenses;
   a viewing lens assembly held spaced apart from and generally above the base assembly by a support arm;
   a viewing lens slot defined on the viewing lens assembly for selectively receiving one of a plurality of interchangeable viewing lenses;
   the light source oriented to emit light through an inspection lens positioned in the inspection lens slot and through a viewing lens positioned in the viewing lens slot, allowing inspection of an eye glass lens positioned between the inspection and viewing lenses;
   a storage assembly having multiple storage compartments defined in the base assembly, each storage compartment for selectively storing one of the plurality of interchangeable inspection and viewing lenses.

2. The eye glasses lens inspection device of claim 1, wherein each of the inspection lenses is mounted in a frame surrounding the perimeter of the inspection lens; and wherein each of the plurality of viewing lenses is mounted in a frame surrounding the viewing lens.

3. The eye glasses inspection device of claim 2, wherein the inspection lens slot and inspection lens frames are cooperatively shaped to allow an inspection lens frame to fit into the inspection lens slot.

4. The eye glasses inspection device of claim 3, wherein each inspection lens frame has an alignment mechanism which cooperates with an alignment mechanism of the inspection lens slot such that an inspection lens frame must be rotationally aligned to fit into the inspection lens slot.

5. The eye glasses inspection device of claim 4, wherein the cooperating alignment mechanisms comprise an asymmetrically shaped inspection lens frame and a corresponding asymmetrically shaped inspection lens slot.

6. The eye glasses inspection device of claim 1, wherein each storage compartment further comprises a storage compartment latch for temporarily holding an inspection lens or viewing lens in the compartment.

7. The eye glasses inspection device of claim 1, wherein at least one of the plurality of inspection lenses has a top side and a bottom side, and must be oriented with the top side face up when in the inspection lens slot to operate correctly, and further comprising an alignment mechanism defined on the inspection lens and inspection lens slot to insure that the inspection lens is positioned with the correct side facing up.

8. A method of using an eye glasses lens inspection device, the method comprising:
   placing a first interchangeable inspection lens frame surrounding the periphery of a first inspection lens in an inspection lens slot defined on a body of the eye glasses lens inspection device;
   viewing at least one eye glasses lens positioned between the first interchangeable inspection lens and a first viewing lens positioned on the eye glasses lens inspection device, a light source positioned in the eye glasses lens inspection device emitting light through the first inspection lens, at least one eye glasses lens, and the first viewing lens;
   removing the first interchangeable inspection lens frame and first lens from the inspection lens slot;
   removing a second interchangeable inspection lens frame surrounding the periphery of a second inspection lens from a storage compartment defined in the body of the eye glasses lens inspection device;

placing the second interchangeable inspection lens frame and second lens in the inspection lens slot;

viewing at least one eye glasses lens positioned between the second interchangeable inspection lens and the viewing lens, the light source emitting light through the second inspection lens, at least one eye glasses lens, and the first viewing lens;

placing at least one of the first or second interchangeable inspection lenses in the storage compartment.

9. The method of claim 8, further comprising: removing the first interchangeable viewing lens frame and first viewing lens from the viewing lens slot;

removing a second interchangeable viewing lens frame surrounding the periphery of a second viewing lens from a storage compartment defined in the body of the eye glasses lens inspection device;

placing the second interchangeable viewing lens frame and second viewing lens in the viewing lens slot.

10. The method of claim 9, further comprising placing at least the first or second viewing lens frame in the storage compartment.

11. The method of claim 8, further comprising rotationally orienting the first inspection frame with respect to the inspection lens slot by aligning cooperating alignment mechanisms defined on the first inspection lens frame and the inspection lens slot.

12. The method of claim 8, further comprising: positioning the first inspection lens top side facing up by using an indicia marked on the first inspection lens frame.

13. The method of claim 8, further comprising: operating a latch to allow removal of the second inspection lens frame from the storage compartment.

14. The method of claim 13, further comprising: tilting the eye glasses inspection lens device by operating a tilt adjustment mechanism mounted on the base assembly.

* * * * *